(12) United States Patent
Mochizuki et al.

(10) Patent No.: US 7,433,999 B2
(45) Date of Patent: Oct. 7, 2008

(54) STORAGE CONTROLLER AND METHOD FOR STORAGE CONTROL WITH NON-CONTIGUOUS STORED PARITIES

(75) Inventors: Shinya Mochizuki, Kawasaki (JP); Mikio Ito, Kawasaki (JP); Hidejiro Daikokuya, Kawasaki (JP); Kazuhiko Ikeuchi, Kawasaki (JP); Hideo Takahashi, Kawasaki (JP); Yoshihito Konta, Kawasaki (JP); Yasutake Sato, Kawasaki (JP); Hiroaki Ochi, Kawasaki (JP); Tsukasa Makino, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 276 days.

(21) Appl. No.: 11/089,218

(22) Filed: Mar. 25, 2005

(65) Prior Publication Data
US 2006/0143508 A1    Jun. 29, 2006

(30) Foreign Application Priority Data
Dec. 14, 2004    (JP) .............................. 2004-361149

(51) Int. Cl.
*G06F 12/00*    (2006.01)
(52) U.S. Cl. ....................... 711/114; 711/112; 711/162; 714/6
(58) Field of Classification Search .................. 711/114
See application file for complete search history.

(56) References Cited

U.S. PATENT DOCUMENTS 6,453,428 B1    9/2002    Stephenson

| | | | |
|---|---|---|---|
| 6,766,480 B2 * | 7/2004 | Oldfield et al. | 714/52 |
| 2002/0091746 A1 * | 7/2002 | Umberger et al. | 709/105 |
| 2003/0016596 A1 * | 1/2003 | Chiquoine et al. | 369/34.01 |
| 2006/0080505 A1 * | 4/2006 | Arai et al. | 711/114 |

FOREIGN PATENT DOCUMENTS

| JP | 11-39104 | 2/1999 |
|---|---|---|
| JP | 2000-148409 | 5/2000 |
| JP | 2000-259359 | 9/2000 |
| KR | 2003-0051996 | 6/2003 |

OTHER PUBLICATIONS

Edward K. Lee, et al. "Performance Consequences of Parity Placement in Disk Arrays," Proceedings of the 4th ASPLOS, Aug. 4, 1991, pp. 190-199.
Hua Shan, " Review on Technlogy RAID" Wuhan Steel Group Technology, pp. 45-49, No. 3, vol. 41.
Office Action issued in Corresponding Chinese Patent Application No. 2005100662690, on Jul. 6, 2007.
European Search Report dated May 15, 2008.

* cited by examiner

*Primary Examiner*—Kevin Ellis
*Assistant Examiner*—Hahem Farrokh
(74) *Attorney, Agent, or Firm*—Staas & Halsey LLP

(57) ABSTRACT

Storage destination controller devices wherein N number of data strips and M number of parity strips comprised in each stripe are determined so that the parity strips are not continuously stored to the same memory device between two consecutive stripes when a plurality of stripes, each comprising the N number of data strips and the M number of parity strips of different types, are distributed and stored to the N+M number of memory devices.

17 Claims, 17 Drawing Sheets

| Disk0 | Disk1 | Disk2 | Disk3 | Disk4 | Disk5 |
|---|---|---|---|---|---|
| D00 | P00 | D01 | Q00 | D02 | R00 |
| P01 | D04 | Q01 | D05 | R01 | D03 |
| D07 | Q02 | D08 | R02 | D06 | P02 |
| Q03 | D0b | R03 | D09 | P03 | D0a |
| D0e | R04 | D0c | P04 | D0d | Q04 |
| R05 | D0f | P05 | D10 | Q05 | D11 |

| Disk0 | Disk1 | Disk2 | Disk3 | Disk4 |
|-------|-------|-------|-------|-------|
| D00 | D01 | D02 | D03 | P00 |

F I G. 1 A

| Disk0 | Disk1 | Disk2 | Disk3 | Disk4 |
|-------|-------|-------|-------|-------|
| D00 | D01 | D02 | D03 | P00 |
| D05 | D06 | D07 | P01 | D04 |
| D0a | D0b | P02 | D08 | D09 |
| D0f | P03 | D0c | P0d | D0e |
| P04 | D10 | D11 | P12 | D13 |

FIG. 1B

| Disk0 | Disk1 | Disk2 | Disk3 | Disk4 | Disk5 |
|---|---|---|---|---|---|
| D00 | D01 | D02 | D03 | P00 | Q00 |
| D05 | D06 | D07 | P01 | Q01 | D04 |
| D0a | D0b | P02 | Q02 | D08 | D09 |
| D0f | P03 | Q03 | D0c | D0d | D0e |
| P04 | Q04 | D10 | D11 | D12 | D13 |
| Q05 | D14 | D15 | D16 | D17 | P05 |

F I G. 1 C

| Disk0 | Disk1 | Disk2 | Disk3 | Disk4 | Disk5 |
|-------|-------|-------|-------|-------|-------|
| D00 | D01 | D02 | D03 | P00 | Q00 |
| D06 | D07 | P01 | Q01 | D04 | D05 |
| P02 | Q02 | D08 | D09 | D0a | D0b |
| D0c | D0d | D0e | D0f | P03 | Q03 |

F I G. 3

| Disk0 | Disk1 | Disk2 | Disk3 | Disk4 | Disk5 |
|-------|-------|-------|-------|-------|-------|
| D00 | D01 | D02 | D03 | P00 | Q00 |
| D06 | D07 | P01 | Q01 | D04 | D05 |
| P02 | Q02 | D08 | D09 | D0a | D0b |
| D0c | D0d | D0e | D0f | Q03 | P03 |
| D12 | D13 | Q04 | P04 | D10 | D11 |
| Q05 | P05 | D14 | D15 | D16 | D17 |

F I G. 4

| Disk0 | Disk1 | Disk2 | Disk3 | Disk4 | Disk5 |
|-------|-------|-------|-------|-------|-------|
| D00 | D01 | P00 | D02 | D03 | Q00 |
| D05 | P01 | D06 | D07 | Q01 | D04 |
| P02 | D0a | D0b | Q02 | D08 | D09 |
| D0e | D0f | Q03 | D0c | D0d | P03 |
| D13 | Q04 | D10 | D11 | P04 | D12 |
| Q05 | D14 | D15 | P05 | D16 | D17 |

F I G. 5

| Disk0 | Disk1 | Disk2 | Disk3 | Disk4 | Disk5 | |
|-------|-------|-------|-------|-------|-------|---|
| D00 | D01 | D02 | D03 | P00 | Q00 | 601 602 |
| D06 | D07 | P01 | Q01 | D04 | D05 | 603 |
| P02 | Q02 | D08 | D09 | D0a | D0b | 604 |
| D0d | D0c | D0f | D0e | Q03 | P03 | 605 |
| D13 | D12 | Q04 | P04 | D11 | D10 | 606 |
| Q05 | P05 | D15 | D14 | D17 | D16 | |

F I G. 6

| Disk0 | Disk1 | Disk2 | Disk3 | Disk4 | Disk5 |
|-------|-------|-------|-------|-------|-------|
| D00   | D01   | D02   | D03   | P00   | Q00   |
| D05   | D06   | P01   | Q01   | D07   | D04   |
| P02   | Q02   | D08   | D09   | D0a   | D0b   |
| D0f   | D0c   | D0d   | D0e   | Q03   | P03   |
| D12   | D13   | Q04   | P04   | D10   | D11   |
| Q05   | P05   | D17   | D14   | D15   | D16   |

F I G. 7

| Disk0 | Disk1 | Disk2 | Disk3 | Disk4 | Disk5 |
|-------|-------|-------|-------|-------|-------|
| D00   | D01   | D02   | P00   | Q00   | R00   |
| P01   | Q01   | R01   | D03   | D04   | D05   |
| D06   | D07   | D08   | P02   | Q02   | R02   |

F I G. 8

| Disk0 | Disk1 | Disk2 | Disk3 | Disk4 | Disk5 |
|-------|-------|-------|-------|-------|-------|
| D00 | D01 | D02 | P00 | Q00 | R00 |
| P01 | Q01 | R01 | D03 | D04 | D05 |
| D06 | D07 | D08 | Q02 | R02 | P02 |
| Q03 | R03 | P03 | D09 | D0a | D0b |
| D0c | D0d | D0e | R04 | P04 | Q04 |
| R05 | P05 | Q05 | D0f | D10 | D11 |

F I G. 9

| Disk0 | Disk1 | Disk2 | Disk3 | Disk4 | Disk5 |
|-------|-------|-------|-------|-------|-------|
| D00 | P00 | D01 | Q00 | D02 | R00 |
| P01 | D04 | Q01 | D05 | R01 | D03 |
| D07 | Q02 | D08 | R02 | D06 | P02 |
| Q03 | D0b | R03 | D09 | P03 | D0a |
| D0e | R04 | D0c | P04 | D0d | Q04 |
| R05 | D0f | P05 | D10 | Q05 | D11 |

F I G. 1 0

| Disk0 | Disk1 | Disk2 | Disk3 | Disk4 | Disk5 |
|-------|-------|-------|-------|-------|-------|
| D00   | D01   | D02   | P00   | Q00   | R00   |
| P01   | Q01   | R01   | D03   | D04   | D05   |
| D07   | D08   | D06   | Q02   | R02   | P02   |
| Q03   | R03   | P03   | D0a   | D0b   | D09   |
| D0e   | D0c   | D0d   | R04   | P04   | Q04   |
| R05   | P05   | Q05   | D11   | D0f   | D10   |

F I G. 1 1

STORAGE CONTROLLER AND METHOD FOR STORAGE CONTROL WITH NON-CONTIGUOUS STORED PARITIES

BACKGROUND OF THE INVENTION

1. Field of the Invention

The present invention relates to a storage controller which controls the distribution and storage of data and parities in a plurality of memory devices such as RAID (Redundant Array of Inexpensive Disks), and a method thereof.

2. Description of the Related Art

RAID is a technology wherein a plurality of hard disks are combined and controlled as one redundant hard disk and is classified into seven levels, from RAID 0 to RAID 6, according to the methods for data allocation to disks and data redundancy. Out of these levels, in RAID 3 to Raid 6, redundancy is realized by storing parities, which have been created from data, independently of the data (for example, refer to Japanese Patent Laid-Open Publication No. 2000-259359).

The mapping of RAID 5 is described first. In RAID 5, performance enhancement is achieved by changing the disk which handles parities, fixed in RAID 4, every time stripes change in order to distribute the parities. For example, in the case of a (4+1) RAID configuration, the allocation of one stripe by RAID 5 mapping is as shown in FIG. 1A. STORAGE CONTROLLER AND METHOD FOR STORAGE CONTROL Here, an (N+1) RAID configuration indicates a configuration wherein the number of disks, N, out of (N+1) disks, handle data strips and one disk handles the parity strips. In the example in FIG. 1A, one stripe comprises data D00 to D03 which are each allocated to four disks, Disk 0 to Disk 3, and parity P00 which is allocated to Disk 4. Data D00 to D03 are arranged and allocated in sequential order of the subscripts starting from D00.

A conventional read process for reading data stored as such does not require parity P00. Therefore, Disk 4, to which the parity is allocated, is not used for read requests for D00 to D03.

If a plurality of stripes is stored in Disk 0 to Disk 4, a read request wherein data which span different stripes is read in sequential order of the subscripts may also be considered. When taking into consideration performance in a sequential read process such as this, it is effective to allocate data D04, which is the head of the next stripe, to Disk 4, to which Parity P00 had been allocated in the previous stripe and to which no access has been made. For example, if the positions of the head data in each stripe are each shifted with every stripe, the allocation of data and parities are as shown in FIG. 1B.

The mappings of data and parities are generally performed in an (N+1)-stripe cycle, corresponding to the (N+1) RAID configuration. Since N=4 here, it is a 5-stripe cycle.

The mapping of RAID 6 is described next. RAID 6 is a RAID level which addresses the failure of a plurality of disks. RAID 6 is indicated by an (N+M) RAID configuration and holds the parity with each stripe, as in RAID 5. Since the M number of disks to which parities are allocated corresponds to the failure of a plurality of disks, it is two or more. Parity P, which is equivalent to RAID 5, and parities Q, R, S, and the like, which differ from parity P, are generally used as these parities.

In the following explanation, in order to address the failure of two disks, the parity P and parity Q are used, with M=2.

If the mapping of RAID 5 shown in FIG. 1B is applied to the (4+2) RAID configuration in RAID 6, the allocation of data and parities are as shown in FIG. 1C. Generally, this is the allocation in the (N+M) stripe cycle, and all of the disks handle both parity P and parity Q.

The mapping of a conventional RAID 6, described above, has the following problem.

In the mapping of RAID 6 shown in FIG. 1C, the same disk handles parity P and parity Q in two consecutive stripes and does not handle data. This is not desirable from the viewpoint of sequential read performance.

SUMMARY OF THE INVENTION

The objective of the present invention is to perform mapping for improving the sequential read performance of a storage device such as RAID, which attains data redundancy by using two or more types of parities.

The storage device according to the present invention comprises a determination device and a controlling device and realizes data redundancy by controlling the distribution and storage of stripes, comprising N number of data strips and M number of parity strips of a different type, to N+M number of memory devices.

The determination device determines the storage destination memory device for the N number of data strips and the M number of parity strips comprised in each stripe, so as to avoid continuously storing the parity strips to the same memory device between two continuous stripes when N+M number of memory devices store a plurality of stripes. The controlling device controls the storage of the N number of data strips and two or more parity strips to each of the determined storage destination memory devices.

BRIEF DESCRIPTION OF THE DRAWINGS

FIG. 1A is a diagram showing a stripe in RAID 5;
FIG. 1B is a diagram showing a mapping in RAID 5;
FIG. 1C is a diagram showing a mapping in RAID 6;
FIG. 3 is a diagram showing a first mapping when M=2;
FIG. 4 is a diagram showing a second mapping when M=2;
FIG. 5 is a diagram showing a third mapping when M=2;
FIG. 6 is a diagram showing a fourth mapping when M=2;
FIG. 7 is a diagram showing a fifth mapping when M=2;
FIG. 8 is a diagram showing a first mapping when M=3;
FIG. 9 is a diagram showing a second mapping when M=3;
FIG. 10 is a diagram showing a third mapping when M=3;
FIG. 11 is a diagram showing a fourth mapping when M=3.

DESCRIPTION OF THE PREFERRED EMBODIMENTS

The preferred embodiments for implementing the present invention are described in detail below, in reference to the diagrams.

Figure 2A:
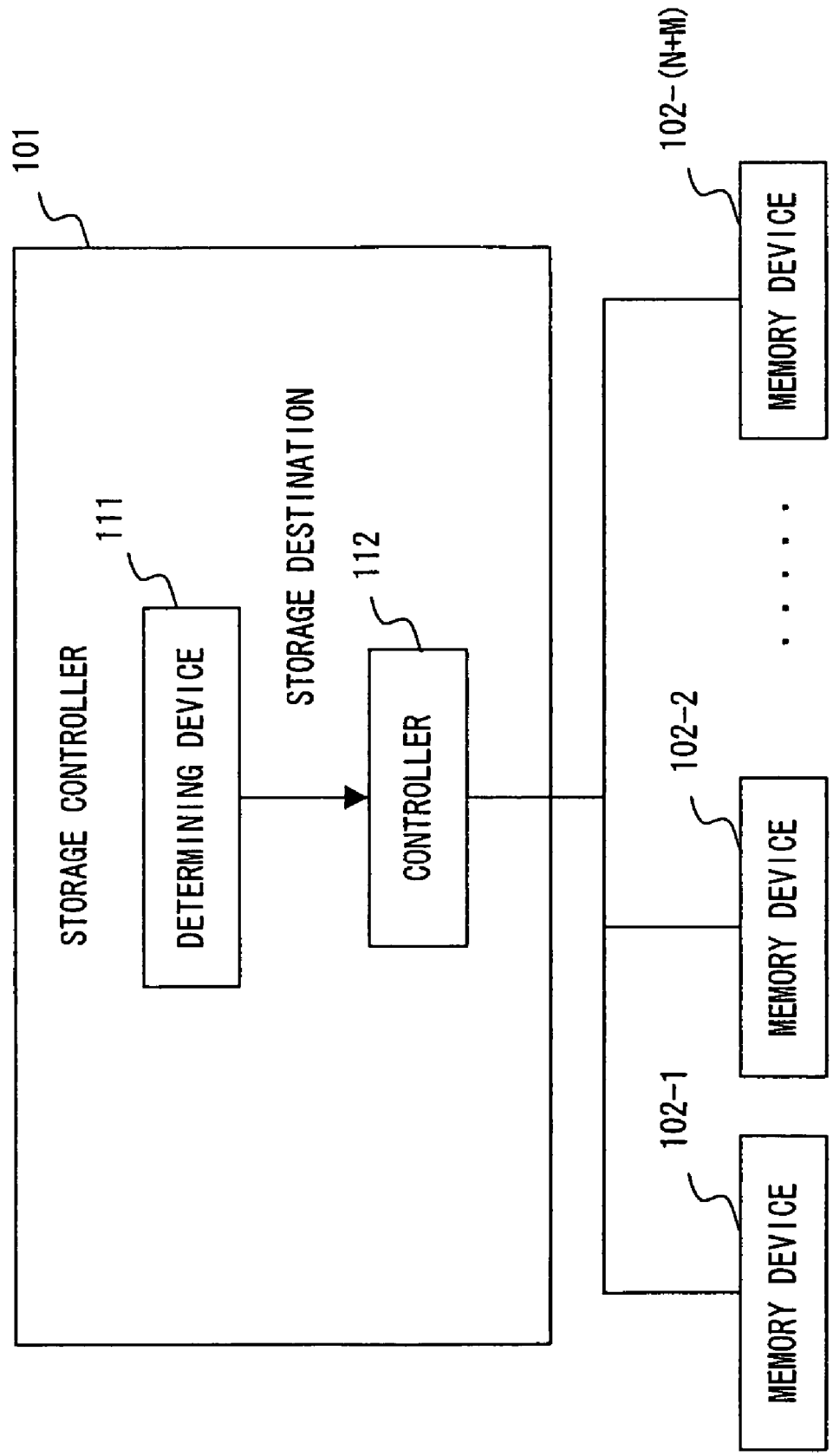
FIG. 2A is the principle diagram of a storage controller according to the present invention.

FIG. 2A is a principle diagram of a storage controller according to the present invention. The storage controller 101 in FIG. 2A comprises a determination device 111 and a controller 112 and realizes data redundancy by controlling the distribution and storage of a stripe, comprising N number of data strips and M number of parity strips of a different type, to N+M number of memory devices, 102-1, 102-2, - - - 102-(N+M).

The determination device 111 determines the storage destination memory devices for the N number of data strips and the M number of parity strips of different types, so as to avoid continuously storing the parity strips to the same memory device between two continuous stripes when the memory devices, 102-1, 102-2, - - - 102-(N+M), store a plurality of stripes. The controller 112 controls the storage of the N number of data strips and two or more parity strips to each of the determined storage destination memory devices.

In an (N+M) RAID configuration, each memory device is equivalent to one or more magnetic disk device. If a plurality of stripes are stored, data and parities within one stripe are dispersed and stored to memory devices 102-1, 102-2, - - - 102-(N+M) so that the same memory does not continuously handle the same type or different types of parity strips between two consecutive stripes. Through this, the access frequency to the N+M number of memory devices is equalized when data which spans different stripes are sequentially read.

The storage device 101 corresponds to, for example, the controller 211 in FIG. 2B, the host bus adaptor 1311 in FIG. 13, or the host device 1401 in FIG. 14, described later.

According to the present invention, the performance of sequential read is enhanced in the storage device wherein the stripe comprising N number of data strips and M number of parity strips of different types is distributed and stored in N+M number of memory devices.

Figure 2B:
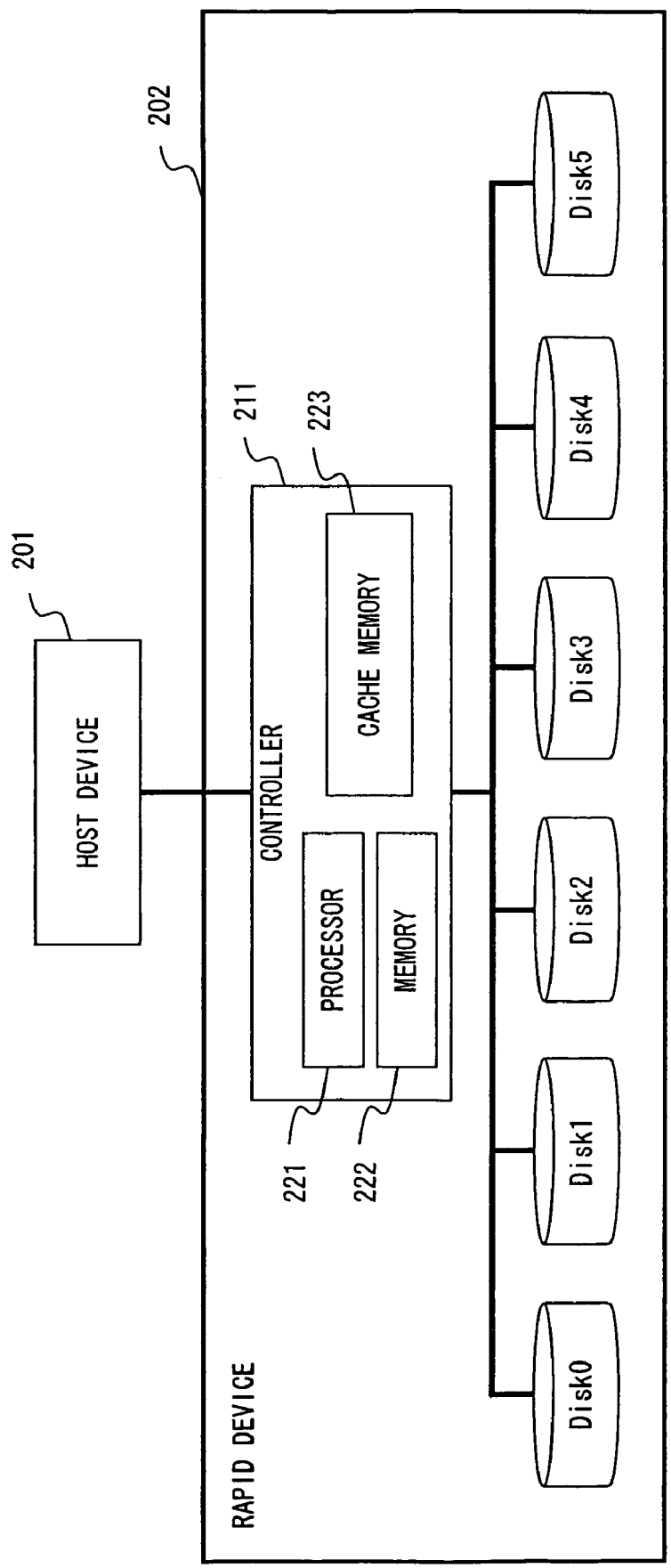
FIG. 2B is a diagram showing the configuration diagram of a first storage system.

FIG. 2B shows a configuration example of the storage system in the embodiment. The storage system in FIG. 2B comprises a host device 201 and a RAID device 202. The RAID device 202 corresponds to the storage device which comprises the controller 211 and six disks, Disk 0 to Disk 5.

Each disk comprises one or more magnetic disk devices, and the host device 201 regards all these disks as one memory device and performs Read/Write of the data. The number of disks connected to the controller 211 is not necessarily limited to six.

The controller 211 comprises a processor 221, memory 222, and cache memory 223 and controls access to Disk 0 to Disk 5. The processor 221 controls access by executing the program stored in the memory 222.

Examples of mappings in the present embodiment in the (N+M) RAID configuration are described next, in reference to FIG. 3 to FIG. 11.

(1) First Mapping

If, taking the performance of sequential read into consideration, in the (4+2) RAID configuration shown in FIG. 1C, the allocation is shifted by two disks for every stripe, so that the parities are not continuous, the mapping is as shown in FIG. 3. In this mapping, the data and the parities are collectively allocated respectively, and the disk handling the same type of parity is shifted by M number of disks for every stripe. In this case, since the same disk never handles the parity in two consecutive stripes, the performance of the sequential read is enhanced.

Generally, in the (N+M) RAID configuration, if the number of disks, (N+M), is a multiple of the number of parities, (M), the allocation is determined as a cycle of (N+M)/M stripes since the allocation is shifted by M disks. Here, since N=4 and M=2, it is a 3-stripe cycle. However, in the mapping in FIG. 3, Parity P is not allocated to Disk 1, Disk 3, or Disk 5, nor is Parity Q allocated to Disk 0, Disk 2 or Disk 4.

On the other hand, in a read process or a rebuild process at the time of a failure of one disk, a process equivalent to RAID 5, using only Parity P and not Parity Q, is implemented in view of performance and the like. In this case, since the load of disks to which the Parities P are not allocated at all differs from those of disks other than the former, there is room for improvement in mapping. As ideas for parity mapping improvement, the following (2) and (3) may be considered:

(2) Second Mapping

As shown in FIG. 4, both stripes wherein P and Q are arranged in order and stripe wherein Q and P are arranged in order are created and allocated so that all disks handle both P and Q. Then, the disks handling of P and Q is circulated every (N+M)/M stripes. Therefore, allocation is performed in an (N+M) stripe cycle.

(3) Third Mapping

As shown in FIG. 5, P and Q are not allocated consecutively, but are one or more disks apart. Here, P and Q are allocated N/M (=2) disks apart, the allocation of the data and the parities is shifted by one disk for every stripe. Therefore, all disks handle both P and Q.

In addition, since P and Q are allocated N/M disks apart within one stripe, the opportunity for a disk to handle either P or Q is equalized in an (N+M)/M stripe cycle. However, the allocations of both data and parity differ from those in RAID 5.

The two improvement ideas, above, are ideas for reducing the differences in load caused by Parity P and Parity Q in the RAID 6 not being equal parity strips and having differing roles. The improvement idea (2) is considered the more effective of the two.

Incidentally, the role of the data strip may differ as do the roles of Parity P and Parity Q. For example, in RAID 6, which is called the RDP (Row-Diagonal Parity) system, a diagonal parity Q is created by using data and the Parity P of RAID 5. However, the roles of each strip within one stripe are not equal. Specifically, in regards to one strip out of the data or P, the entire strip is used to create the diagonal parity Q. On the other hand, in the remaining data and Parity P strips, only a part thereof is used to create Q.

Because of the foregoing, a difference in load is generated between a disk handling data and a disk handling Parity P when the restoration of Parity Q is performed in the reconstruction processing at the time of a failure of one disk. Therefore, there is room for improvement in mapping. As ideas for data mapping improvement, the following (4) and (5) may be considered:

(4) Fourth Mapping

For example, if the entire P strip is used to create Q, more updates of Q accompanying updates of P are generated. In other words, since the updates of Q are increased to update a small quantity of data, this is not very effective. Therefore, the entire strip used to create Q is determined to be assigned to one of the data strips, and not to the P strip.

It is temporarily presumed that the head data strip within the stripe is a strip that uses all the data to create Q. In this case, the load is not equally distributed in the mappings in FIG. 3 and FIG. 4 because there are disks which handle the head data and disks which do not. For example, in the mapping in FIG. 3, the head data is allocated to Disk 0, Disk 2, and Disk 4, and the head data is not allocated to Disk 1, Disk 3, or Disk 5.

In order to reduce imbalances such as this, the cyclic rearrangement of P and Q, implemented in the mapping in FIG. 4, is implemented for the data strip as shown in FIG. 6, and the mapping order of the data and the parities to the arrayed M number of disks is circulated every (N+M)/M stripes.

For example, the allocations of the first three stripes, 601 to 603, are the same as in FIG. 4, and the head data, D00, D04 and D08, of each stripe are distributed to Disk 0, Disk 4 and Disk 2.

In the subsequent three stripes, 604 to 606, although the allocations of P and Q are the same as in FIG. 4, the allocation of data is reversed between two adjacent disks as compared with those in that of FIG. 4. Specifically, the allocations of D0*c* and D0*d* in stripe 604 are the reverse of those in FIG. 4, and the allocations of D0*e* and D0*f* are also the reverse of those in FIG. 4. This is the same for the allocations of stripes 605 and 606, as well. As a result of data rearrangement such as this, the head data, D0*c*, D10, and D14, in each stripe are distributed to Disk 1, Disk 5, and Disk 3.

Thus, in the mapping in FIG. 6, P, Q and the head data can be distributed and allocated to all of the disks.

(5) Fifth mapping

This mapping is a variation of the improvement idea in (4), above. As shown in FIG. 7, although the allocation of the parities is the same as that in FIG. 3, the allocation of data differs. In this mapping, the location of the head data within the stripe is selected by shifting the location for every stripe, out of the M number of disks handling the parity in the immediately preceding stripe. However, since the 2nd data to M-th data may be allocated to the disk handling data also in the immediately preceding stripe, this is inferior in terms of sequential read performance to the improvement idea in (4).

Although FIG. 3 to FIG. 7 show mapping examples when M=2, these mappings can be applied to RAID configurations in cases wherein M☐3, as well. FIGS. 8, 9, 10, and 11 show the examples wherein the mappings in (1), (2), (3), and (4) are each applied to a (3+3) RAID configuration.

The controller 211 performs a mapping process, such as that explained above, according to the RAID configuration in order to perform a Read/Write Access of data or parities to the disk. Therefore, the mapping process performed by the controller 211 in the (N+M) RAID configuration is described in detail.

In the following explanation, the operator "/" indicates a quotient in the division of the integer and the operator "%" indicates a remainder in the division, as in C language. First, the definition of variables used for the mapping processing is explained.

Number of Disks in RAID Configuration: (N+M)

(N+M) is the number of disks configuring a RAID group. The RAID group comprises a total number of (N+M) disks, of which N disks are for data capacity and M disks for parity capacity. Here, the total number of disks, (N+M), is set to a multiple of the number of disks for parity, M.

Strip Size: S

S indicates the data capacity (number of blocks or the like) of one strip and is the same as stripe depth.

Address assigned to Data: a a is an address which is sequentially assigned to data, excluding parities, and is an integer of 0 or more. I/O request to data from the host device 201 is executed by designating the address a.

Stripe Number: i i is a number indicating the stripe to which the data and the parity corresponding thereto belong and is an integer of 0 or more. i is determined from the data address a and the RAID configuration and is provided by the following formula:

$i=a/(N*S)$

Strip Number: j j is a number indicating the order of the strips which belong to a stripe. j, which is $0<=j<(N-1)$, is assigned to data strips. j of data strips is provided by the following formula, and data is sequentially stored according to data address a.

$j=(a\%(S*N))/S$ j, which is $N<=j<=(N+M-1)$, is assigned to parity strips. For example, j=N is assigned to Parity P and j=N+1 is assigned to Parity Q.

Disk Number: d d is a number specifying the disk which is to be the access target, of the disks configuring a RAID system, and is $0<=d<=(N+M-1)$, d is determined with i and j as the parameters, according to the mapping method to be implemented.

A mapping process using the afore-mentioned definitions of the variables is described next. In this mapping process, the stripe number i and the strip number j are determined from the data address a according to the mapping method, and the disk number d of the access target is determined.

1. Conventional Mapping

In the conventional mapping method shown in FIG. 1C, the disk number d is shifted by one disk each. d is calculated by the following formula:

$d=(j+i*(N+M-1))\%(N+M)$

2. First Mapping

In the mapping methods shown in FIGS. 3 and 8, the disk number d is shifted by the number of parities. d is calculated by the following formula:

$d=(j+(i*N))\%(N+M)$

3. Second Mapping

In the mapping methods shown in FIGS. 4 and 9, the array of M number of parities is circulated in the afore-mentioned first mapping. d for data is the same as in the first mapping and is calculated by the following formula:

$d=(j+(i*N))\%(N+M)$

In regards to parities, however, the number of the head disk out of the disks to which parities are allocated in each stripe is determined as ptop, and ptop is calculated by the following formula:

$p\ top=(N+(i*N))\%(N+M)$ d, in regards to parities, is calculated by the following formula using this ptop:

$d=p\ top+(j-N+(M-1)*(i/(N+M)/M)\%M$

4. Third Mapping

In the mapping methods shown in FIGS. 5 and 10, parity is distributed non-consecutively, and the disk number d is shifted by one disk each. In regards to data, d is calculated by the following formula:

$d=(i*(N+M-1)+j/(N/M)*((N+M)/M+j)\%(N/M))\%(N+M)$

On the other hand, in regards to parity, d is calculated by the following formula:

$d=(i*(N+M-1)+(j-N)*((N+M)/M)+(N/M))\%(N+M)$

5. Fourth Mapping

In the mapping methods shown in FIGS. 6 and 11, the circulation of the M number of parities in the afore-mentioned second mapping is also applied to data, and the array of the M number of data is circulated by group as one group. In this case, the total number of groups of parity and data, gnum, is calculated by the following formula:

$$g\,num = (N+M)/M$$

The number, gi, of the group to which the data or the parity belongs and the order, gj, within the group is provided by the following formulas:

$$gi = j/M$$

$$gj = j\,\%\,M$$

If the number of the head disk in the group to which a data or parity belongs is determined to be gtop, gtop is calculated by the following formula:

$$g\,top = (gi*M + i*N)\,\%\,(N+M)$$

d is calculated by the following formula using this gtop:

$$d = g\,top + ((gj + (M-1)*(i/g\,num))\,\%\,M)$$

The controller 211 performs Read/Write of the data or the parity, with the disk corresponding to the value of d obtained by the formulas, above, as the access target.

Figure 12:
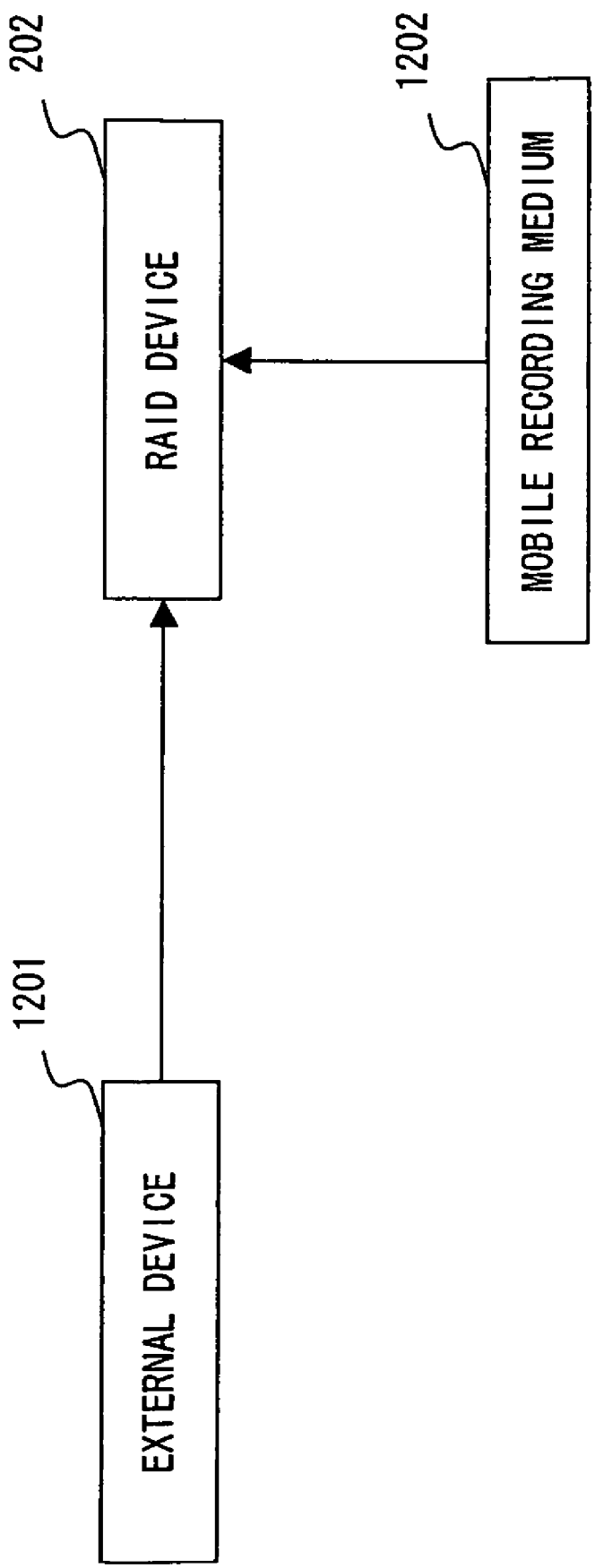
FIG. 12 is a diagram showing a method for providing a program and data.

FIG. 12 shows a method for providing the program and data that the processor 221 of the controller 221 uses for processing. Program and data stored in external device 1201, such as information processors, or mobile recording medium 1202 are loaded to the memory 222 of the RAID device 202.

The external device 1201 generates a carrier signal which carries this program and data and transmits this signal to the RAID device 202 through an arbitrary transmission medium on a communication network. The mobile recording medium 1202 is an arbitrary computer-readable recording medium, such as a memory card, a flexible disk, an optical disk, or a magneto-optical disk. The processor 221 executes the program using this data and performs the necessary processing.

Figure 13:
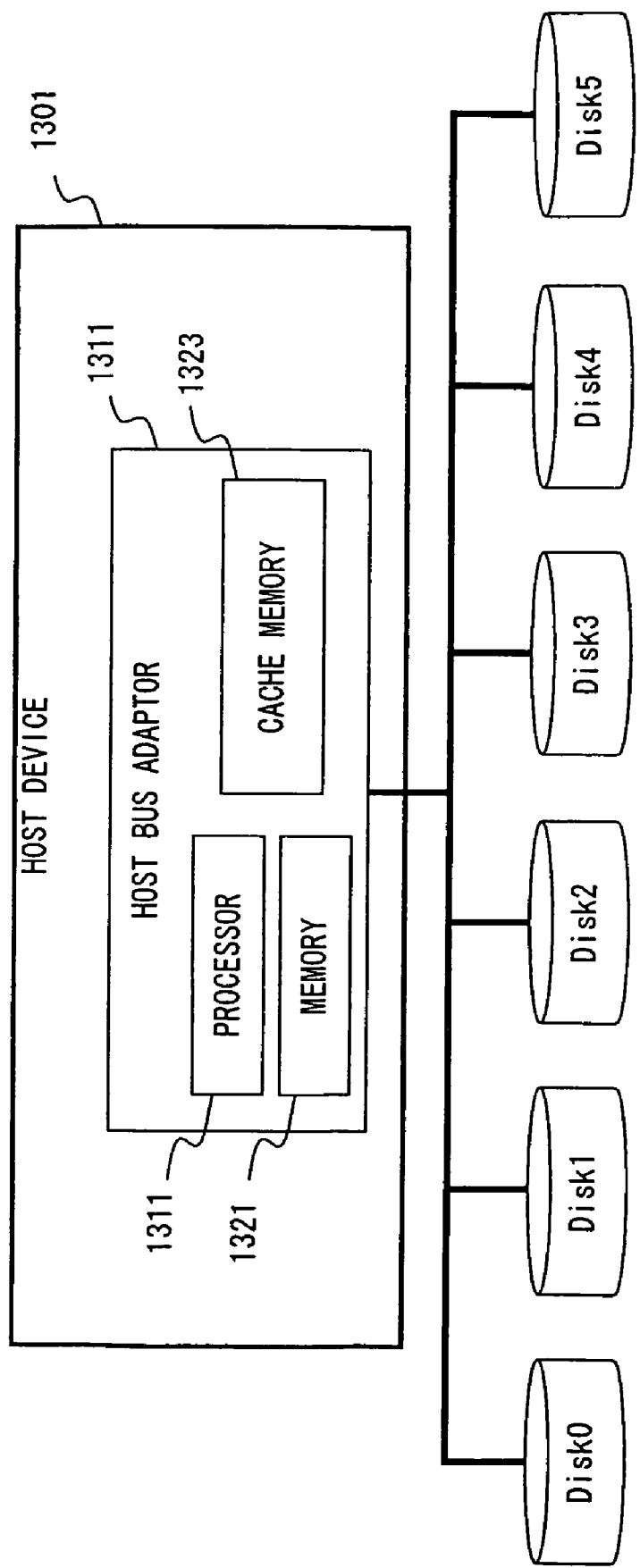
FIG. 13 is a configuration diagram showing a second storage system.
Figure 14:
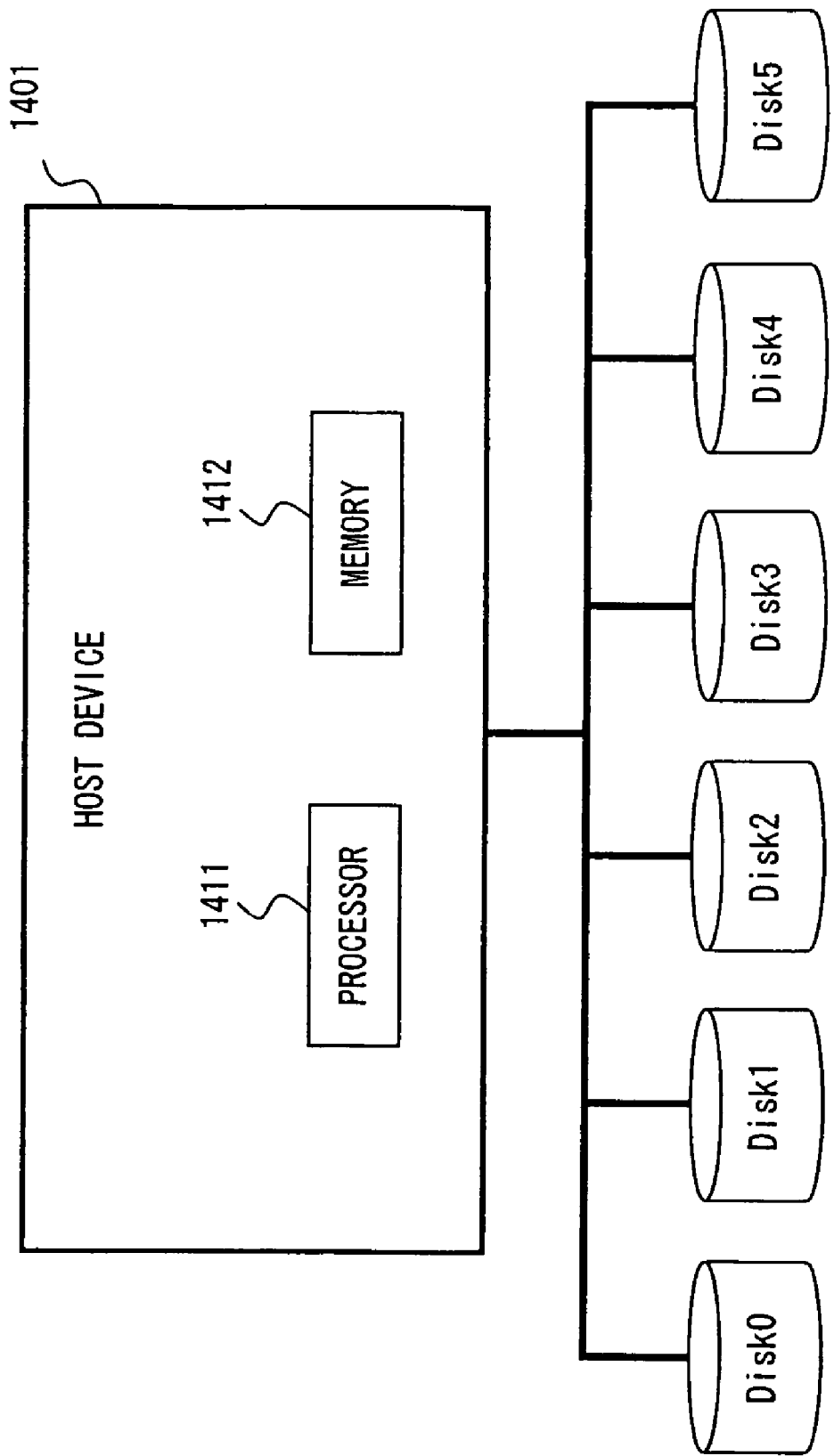
FIG. 14 is a configuration diagram showing a third storage system.

FIGS. 13 and 14 show other configuration examples of the storage system. FIG. 13 shows an example wherein a host bus adaptor mounted on the host device controls disk access. FIG. 14 shows an example wherein software installed in the host device controls disk access. In either of the configurations, the necessary program and data are provided as in the RAID device 202.

The storage system in FIG. 13 comprises a host device 1301 and Disk 0 to Disk 5. The host device 1301 comprises a host bus adaptor 1311. The host bus adaptor 1311 comprises a processor 1321, memory 1322, and cache memory 1323, and controls access to Disk 0 to Disk 5. At this time, the processor 1321 executes the program stored in the memory 1322 to perform the afore-mentioned mapping processing.

The storage system in FIG. 14 comprises a host device 1401 and Disk 0 to Disk 5. The host device 1401 comprises a processor 1411 and memory 1412 and controls access to Disk 0 to Disk 5. At this time, the processor 1411 executes the program stored in the memory 1412 to perform the afore-mentioned mapping processing.

In addition, although a magneto-optical disk device is used as a disk device in the afore-mentioned embodiments, the present invention can be applied to a storage system which uses disk devices such as optical disk device, magneto-optical disk device, and other memory devices such as tape devices.

What is claimed is:

1. A storage controller, which realizes data redundancy by controlling the distribution and storage of a stripe comprising N number of data strips and M number of parity strips of differing types to N+M number of memory devices comprising:

a determination device for determining a storage destination memory devices for the N number of data strips and the M number of parity strips comprised in each stripe so that parity strips of any type are not continuously stored to the same memory device between two consecutive stripes when said N+M number of memory devices store a plurality of stripes; and a controller for controlling the storage of said N number of data strips and two or more parity strips to each of the determined storage destination memory devices, and wherein said determination device determines a stripe number i, indicating the stripe to which a data or a parity belongs, and a strip number j, indicating the strip to which the data or the parity belongs within the stripe, from the designated data address and finds a memory device number d of the memory device to which the data or the parity is stored by a calculation using the following formula, with the operator indicating a remainder in the division of an integer as %:

$$d = (j + (i*N))\,\%\,(N+M).$$

2. A storage controller according to claim 1, wherein said determination device determines said storage destination memory devices so that the parity strips comprised in said plurality of stripes are equally distributed in said N+M memory devices.

3. A storage controller according to claim 2, wherein said determination device determines said storage destination memory devices so that the numbers of the memory devices to which parity strips of the same type are stored are shifted by M for every stripe.

4. A storage controller according to claim 2, wherein said determination device determines said storage destination memory devices so that the parity strips of the same type comprised in said plurality of stripes are equally distributed in said N+M number of memory devices.

5. A storage controller according to claim 4, wherein said determining device determines said storage destination memory devices so that the numbers of the memory which stores the parity strips of the same type are shifted by M for every stripe and the numbers of the memory devices which store M number of parity strips are circulated every (N+M)/M stripes.

6. A storage controller according to claim 4, wherein said determination device determines said storage destination memory devices so that the numbers of the memory devices which store the parity strips of the same type are shifted by one for every stripe and the numbers of the memory devices which store M number of parity strips within each stripe are not consecutive.

7. A storage controller according to claim 1 or 4, wherein said determination device determines said storage destination memory devices so that the data strips comprised in said plurality of the stripes are equally distributed in said N+M number of memory devices.

8. A storage controller according to claim 7, wherein said determination device determines said storage destination memory devices so that the number of the memory device which stores the parity strips of the same type are shifted by M for every stripe and the numbers of the memory devices which store M number of parity strips are circulated every (N+M)/M stripes.

9. A storage controller, which realizes data redundancy by controlling the distribution and storage of a stripe comprising N number of data strips and M Rumber of parity strips of differing types to N+M number of memory devices, comprising:

a determination device for determining storage destination memory devices for the N number of data strips and the M number of parity strips comprised in each stripe so that parity strips are not continuously stored to the same memory device between two consecutive stripes when said N+M number of memory devices store a plurality of stripes; and a controller for controlling the storage of said N number of data strips and two or more parity strips to each of the determined storage destination memory devices, wherein said determination device determines said storage destination memory devices so that the parity strips comprised in said plurality of stripes are equally distributed in said N+M memory devices, and wherein said determination device determines a stripe number i, indicating the stripe to which a data or a parity belongs, and a strip number j, indicating the strip to which the data or the parity belongs within the stripe, from the designated data address and finds a memory device number d of the memory device to which the data or the parity is stored by a calculation using the following formula, with the operator indicating a remainder in the division of an integer as %:

$$d(j=(i*N)) \% (N+M).$$

10. A storage controller, which realizes data redundancy by controlling the distribution and storage of a stripe comprising N number of data strips and M number of parity strips of differing types to N+M number of memory devices, comprising:

a determination device for determining storage destination memory devices for the N number of data strips and the M number of parity strips comprised in each stripe so that parity strips are not continuously stored to the same memory device between two consecutive stripes when said N+M number of memory devices store a plurality of stripes; and a controller for controlling the storage of said N number of data strips and two or more parity strips to each of the determined storage destination memory devices, wherein said determination device determines said storage destination memory devices so that the parity strips of the same type comprised in said plurality of stripes are equally distributed in said N+M number of memory devices, and wherein said determination device determines a stripe number i, indicating the stripe to which data or parity belongs, and a strip number j, indicating the strip to which the data or the parity belongs within the stripe, from the designated data address, and, when a memory device number d is determined by i and j, determines d using a calculation of the following formula, with the operator indicating a remainder in the division of an integer as % in regards to the storage destination of data:

$$d=(j+(i*N)) \% (N+M)$$

and determines d by a calculation of the following formula, with the operator indicating a quotient in the division of an integer as f in regards to the storage destination of parities:

$$p\text{top}=(N+(i*N)) \% (N+M)$$

$$d=p\text{top}+(j-N+(M-1)*(i/(N+M)/M)) \% M.$$

11. A storage controller, which realizes data redundancy by controlling the distribution and storage of a stripe comprising N number of data strips and M number of parity strips of differing types to N+M number of memory devices, comprising:

a determination device for determining storage destination memory devices for the N number of data strips and the M number of parity strips comprised in each stripe so that parity strips are not continuously stored to the same memory device between two consecutive stripes when said N+M number of memory devices store a plurality of stripes; and a controller for controlling the storage of said N number of data strips and two or more parity strips to each of the determined storage destination memory devices wherein said determination device determines said storage destination memory devices so that the parity strips comprised in said plurality of stripes are equally distributed in said N+M memory devices, wherein said determination device determines said storage destination memory devices so that the parity strips of the same type comprised in said plurality of stripes are equally distributed in said N+M number of memory devices, and wherein said determination device determines a stripe number i, indicating the stripe to which data or parity belongs, and a strip number j, indicating the strip to which the data or parity belongs within the stripe, from the designated data address, and, when a memory device number d is determined by i and j, finds d by a calculation using the following formula, with the operator indicating a quotient in the division of an integer as/and a remainder in the division of the integer as %, in regards to the storage destination of data:

$$d=(i*(N+M-1)+j/(N/M)*((N+M)/M)+j) \% N/M)) \% (N+M)$$

and determines d by a calculation using the following formula, in regards to the storage destination of parities:

$$d=(i*(N+M-1)+(j-N)*((N+M)/M)+(N/M)) \% (N+M).$$

12. A storage controller, which realizes data redundancy by controlling the distribution and storage of a stripe comprising N number of data strips and M number of parity strips of differing types to N+M number of memory devices, comprising:

a determination device for determining storage destination memory devices for the N number of data strips and the M number of parity strips comprised in each stripe so that parity strips are not continuously stored to the same memory device between two consecutive stripes when said N+M number of memory devices store a plurality of stripes; and a controller for controlling the storage of said N number of data strips and two or more parity strips to each of the determined storage destination memory devices, wherein said determination device determines said storage destination memory devices so that the data strips comprised in said plurality of the stripes are equally distributed in said N+M number of memory devices, and wherein said determination device determines a stripe number i, indicating the stripe to which a data or parity belongs, and a strip number j, indicating the strip to which the data or parity belongs within the stripe, from the designated data address, and finds a memory device number d of the memory device to which the data or the parity is stored by the calculations of the following formulas, with the operator indicating a quotient in the division of an integer as/and the operator indicating a remainder in the division of an integer as %:

$g\text{top} = (gi^*M + i^*N) \% (N+M)$ $d = g\text{top} + ((gj + (M-1)^*(i/g\text{num})) \% M).$

13. A storage device comprising:

N+M number of memory devices which distribute and store a stripe comprising N number of data strips and M number of parity strips of different types in order to realize data redundancy;

a determination device which determines storage destination memory devices for the N number of data strips and the M number of parity strips comprised in each stripe so that the parity strips of any type are not continuously stored to the same memory device between two consecutive stripes when the N+M number of memory devices store a plurality of stripes; and a controller which controls the storage of the N number of data strips and two or more parity strips in each of the determined storage destination memory devices, and wherein said determination device determines a stripe number i, indicating the stripe to which data or parity belongs, and a strip number j, indicating the strip to which the data or the parity belongs within the stripe, from the designated data address, and, when a memory device number d is determined by i and j, determines d using a calculation of the following formula, with the operator indicating a remainder in the division of an integer as % in regards to the storage destination of data:

$d = (j + (i^*N)) \% (N+M)$ and determines d by a calculation of the following formula, with the operator indicating a quotient in the division of an integer as/in regards to the storage destination of parities:

$p\text{top} = (N + (i^*N)) \% (N+M)$ $d = p\text{top} + (j - N + (M-1)^*(i/(N+M)/M)) \% M.$

14. A recording medium to which a program for a processor which realizes data redundancy by controlling the distribution and storage of a stripe, comprising N number of data strips and M number of parity strips of different types to N+M number of memory devices, is recorded, wherein the program enables the processor to execute processing for;

determining the storage destination memory devices for the N number of data strips and the M number of parity strips comprised in each stripe so that the parity strips of any type are not continuously stored in the same memory device between two consecutive stripes when said N+M number of memory devices store a plurality of stripes; and storing said N number of data strips and two or more parity strips to each of the determined storage destination memory devices, and wherein said determination device determines a stripe number i, indicating the stripe to which a data or a parity belongs, and a strip number j, indicating the strip to which the data or the parity belongs within the stripe, from the designated data address and finds a memory device number d of the memory device to which the data or the parity is stored by a calculation using the following formula, with the operator indicating a remainder in the division of an integer as %:

$d = (j + (i^*N)) \% (N+M).$

15. A storage control method for realizing data redundancy by distributing and storing a stripe comprising N number of data strips and M number of parity strips of different types to N+M number of memory devices, wherein the method:

determines storage destination memory devices for the N number of data strips and the M number of parity strips comprised in each stripe so that the parity strips of any type are not continuously stored to the same memory device between two consecutive stripes when said N+M number of memories store a plurality of stripes; and stores the N number of data strips and two or more parity strips to each of the determined storage destination memory devices, and wherein said determination device determines a stripe number i, indicating the stripe to which data or parity belongs, and a strip number j, indicating the strip to which the data or the parity belongs within the stripe, from the designated data address, and, when a memory device number d is determined by i and j, determines d using a calculation of the following formula, with the operator indicating a remainder in the division of an integer as % in regards to the storage destination of data:

$d = (j + (i^*N)) \% (N+M).$ and determines d by a calculation of the following formula, with the operator indicating a quotient in the division of an integer as/in regards to the storage destination of parities:

$p\text{top} = (N + (i^*N)) \% (N+M)$ $d = p\text{top} + (j - N + (M-1)^*(i/(N+M)/M)) \% M.$

16. A computer readable storage for controlling a computer and storing a program for a processor which realizes data redundancy by controlling the distribution and storage of a stripe comprising N number of data strips and M number of parity strips of different types in N+M number of memory devices, wherein said program enables the processor to execute processing for:

determining storage destination memory devices for the N number of data strips and the M number of parity strips comprised in each stripe so that the parity strips of any type are not continuously stored to the same memory device between two consecutive stripes when said N+M number of memory devices store a plurality of stripes; and storing said N number of data strips and two or more parity strips to each of the determined storage destination memory devices, and wherein said determination device determines a stripe number i, indicating the stripe to which a data or a parity belongs, and a strip number j, indicating the strip to which the data or the parity belongs within the stripe, from the designated data address and finds a memory device number d of the memory device to which the data or the parity is stored by a calculation using the following formula, with the operator indicating a remainder in the division of an integer as %:

$d = (j + (i^*N)) \% (N+M).$

17. A storage controller for realizing data redundancy by controlling the distribution and storage of a stripe comprising N number of data strips and M number of parity strips of different types in N+M number of memory devices, comprising:

a determination means for determining the storage destination memory devices of the N number of data strips and the M number of parity strips comprised in each stripe so that the parity strips of any type are not continuously stored to the same memory device between two consecutive stripes when said N+M number of memories store a plurality of stripes; and a control means for controlling the storage of said N number of data strips and two or more parity strips to each of the determined storage destination memories, and wherein said determination device determines a stripe number i, indicating the stripe to which a data or a parity belongs, and a strip number j, indicating the strip to which the data or the parity belongs within the stripe, from the designated data address and finds a memory device number d of the memory device to which the data or the parity is stored by a calculation using the following formula, with the operator indicating a remainder in the division of an integer as %:

$$d=(j+(i*N)) \% (N+M).$$

* * * * *

UNITED STATES PATENT AND TRADEMARK OFFICE
CERTIFICATE OF CORRECTION

PATENT NO. : 7,433,999 B2  
APPLICATION NO. : 11/089218  
DATED : October 7, 2008  
INVENTOR(S) : Shinya Mochizuki et al.

It is certified that error appears in the above-identified patent and that said Letters Patent is hereby corrected as shown below:

On the Title Page Item (54) (Title), Lines 2-3, after "CONTROL" delete "WITH NON-CONTIGUOUS STORED PARITIES".

On the Title Page, Item (56) (Other Publications), Line 4, change "Technlogy" to --Technology--.

On the Title Page, Item (Assistant Examiner), Line 1, change "Hahem" to --Hashem--.

Column 1 (Title), Lines 2-3, after "CONTROL" delete "WITH NON-CONTIGUOUS STORED PARITIES".

Column 7, Line 66, change "devices" to --devices,--.

Column 8, Line 1, after "determining" delete "a".

Column 8, Line 65, change "Rumber" to --number--.

Column 9, Line 25, change "d(j=(iN))" to --d = (j + (i N))--.

Column 9, Line 60, change "as fin" to --as/in--.

Column 10, Line 34, change "((N+M)/M)+j) %N/M))" to --((N + M) / M) + j % (N / M))--.

Column 12, Line 24, change "(N+M)." to --(N+M)--.

Signed and Sealed this

Sixth Day of January, 2009

JON W. DUDAS  
*Director of the United States Patent and Trademark Office*